United States Patent
Nakanishi et al.

(10) Patent No.: US 7,576,503 B2
(45) Date of Patent: Aug. 18, 2009

(54) BRUSHLESS MOTOR CONTROL APPARATUS FOR PUMP

(75) Inventors: Shingo Nakanishi, Obu (JP); Masahiro Kako, Toyota (JP)

(73) Assignee: Aisan Kogyo Kabushiki Kaisha, Obu (JP)

(*) Notice: Subject to any disclaimer, the term of this patent is extended or adjusted under 35 U.S.C. 154(b) by 348 days.

(21) Appl. No.: 11/604,203

(22) Filed: Nov. 27, 2006

(65) Prior Publication Data
US 2007/0132418 A1    Jun. 14, 2007

(30) Foreign Application Priority Data
Dec. 14, 2005  (JP)  .............. 2005-360141
Nov. 21, 2006  (JP)  .............. 2006-313811

(51) Int. Cl.
*H02P 6/00* (2006.01)

(52) U.S. Cl. ............ 318/400.01; 318/700; 318/400.04; 318/400.06; 318/601; 318/611; 700/75; 700/69

(58) Field of Classification Search ............ 318/400.01, 318/700, 400.04, 400.06, 601.611; 700/75, 700/69
See application file for complete search history.

(56) References Cited

U.S. PATENT DOCUMENTS

| | | | | |
|---|---|---|---|---|
| 5,592,058 A | * | 1/1997 | Archer et al. | 318/400.09 |
| 6,462,491 B1 | * | 10/2002 | Iijima et al. | 318/400.34 |
| 6,479,956 B1 | * | 11/2002 | Kawabata et al. | 318/400.12 |
| 6,879,129 B2 | * | 4/2005 | Tazawa et al. | 318/727 |
| 7,064,513 B2 | * | 6/2006 | Fenley | 318/700 |
| 7,271,556 B2 | * | 9/2007 | Kishibe et al. | 318/254.2 |

FOREIGN PATENT DOCUMENTS

| JP | B2 2642357 | 1/1989 |
|---|---|---|
| JP | A 2003-088080 | 3/2003 |

* cited by examiner

*Primary Examiner*—Rita Leykin
(74) *Attorney, Agent, or Firm*—Oliff & Berridge, PLC (57) ABSTRACT

A brushless motor controller for use in a fuel pump detects a rotor phase based on an induced voltage in each phase coil of a brushless motor, and controls energization of the each phase coil based on the detected rotor phase. A control circuit of the controller is arranged to check the induced voltage by using three reference voltages as judgment values, convert a result of the check into a logic signal, and detect the rotor phase based on a prescribed change of the logic signal.

24 Claims, 9 Drawing Sheets

THE CASE OF NORMAL CHANGE OF A1

FIG. 9

THE CASE OF A1 WITH NOISE

BRUSHLESS MOTOR CONTROL APPARATUS FOR PUMP

BACKGROUND OF THE INVENTION

1. Field of the Invention

The present invention relates to a brushless motor incorporated in a pump, and more particularly to a brushless motor control apparatus for a pump for controlling a brushless motor.

2. Description of Related Art

As a technique of this kind, a brushless motor control apparatus described, for example, in U.S. Pat. No. 2,642,357 has been known. The brushless motor described in the patent publication detects a phase based on a neutral point of induced voltage in each phase coil. There are cases in which, as an induced voltage changes, a pulse-shaped back voltage is generated possibly resulting in erroneous detection of a phase. To prevent such erroneous detection of a phase, the control apparatus described in U.S. Pat. No. 2,642,357 applies a mask to neutral point detection for a certain amount of time.

It is stated, for example, in Japanese unexamined patent publication No. 2003-88080 that, in recent years, a brushless motor is adopted for a pump so as to miniaturize the pump.

In this regard, however, the control described in U.S. Pat. No. 2,642,357 is not necessarily applicable to every type of brushless motor. Namely, in the case of a brushless motor with large inductance, a brushless motor which draws a large current or a brushless motor for use in a low-revolution range, a pulse-shaped induced voltage stays relatively long, so that it becomes necessary to change the amount of time during which a mask is applied to neutral point detection depending on the type of the brushless motor. Hence, it is not possible to commonly use a same control circuit to control different types of brushless motors.

SUMMARY OF THE INVENTION

The present invention has been made in view of the above situation, and it is an object of the present invention to provide a brushless motor control apparatus for a pump which can properly detect a phase requiring no mask to be applied in detecting a neutral point of an induced voltage.

To achieve the above object, the present invention provides a brushless motor control apparatus for a pump, the control apparatus being adapted to detect a phase based on an induced voltage in each phase coil of a brushless motor provided in a pump and control energization of the each phase coil based on the detected phase: wherein the control apparatus checks the induced voltage using a plurality of reference voltages as judgment values, converts a result of the check into a logic signal, and detects the phase based on a prescribed change in the logic signal.

According to another aspect, the present invention provides a brushless motor control apparatus for a pump, the control apparatus being adapted to detect a phase based on an induced voltage in each phase coil of a brushless motor provided in a pump and control energization of the each phase coil based on the detected phase: wherein the control apparatus checks the induced voltage using a plurality of reference voltages as judgment values, converts a result of the check into a logic signal, and detects a fault based on a cyclical change of the logic signal.

Further, according to another aspect, the present invention provides a brushless motor control apparatus for a pump, the control apparatus being adapted to detect a phase based on an induced voltage in each phase coil of a brushless motor provided in a pump and control energization of the each phase coil based on the detected phase: wherein arithmetic processing of a waveform obtained by comparison between the induced voltage and three or more reference voltages is performed to detect a position of a movable member of the pump.

DETAILED DESCRIPTION OF THE PREFERRED EMBODIMENT

An embodiment of a brushless motor control apparatus for a pump according to the present invention will be described in detail with reference to the accompanying drawings.

Figure 1:
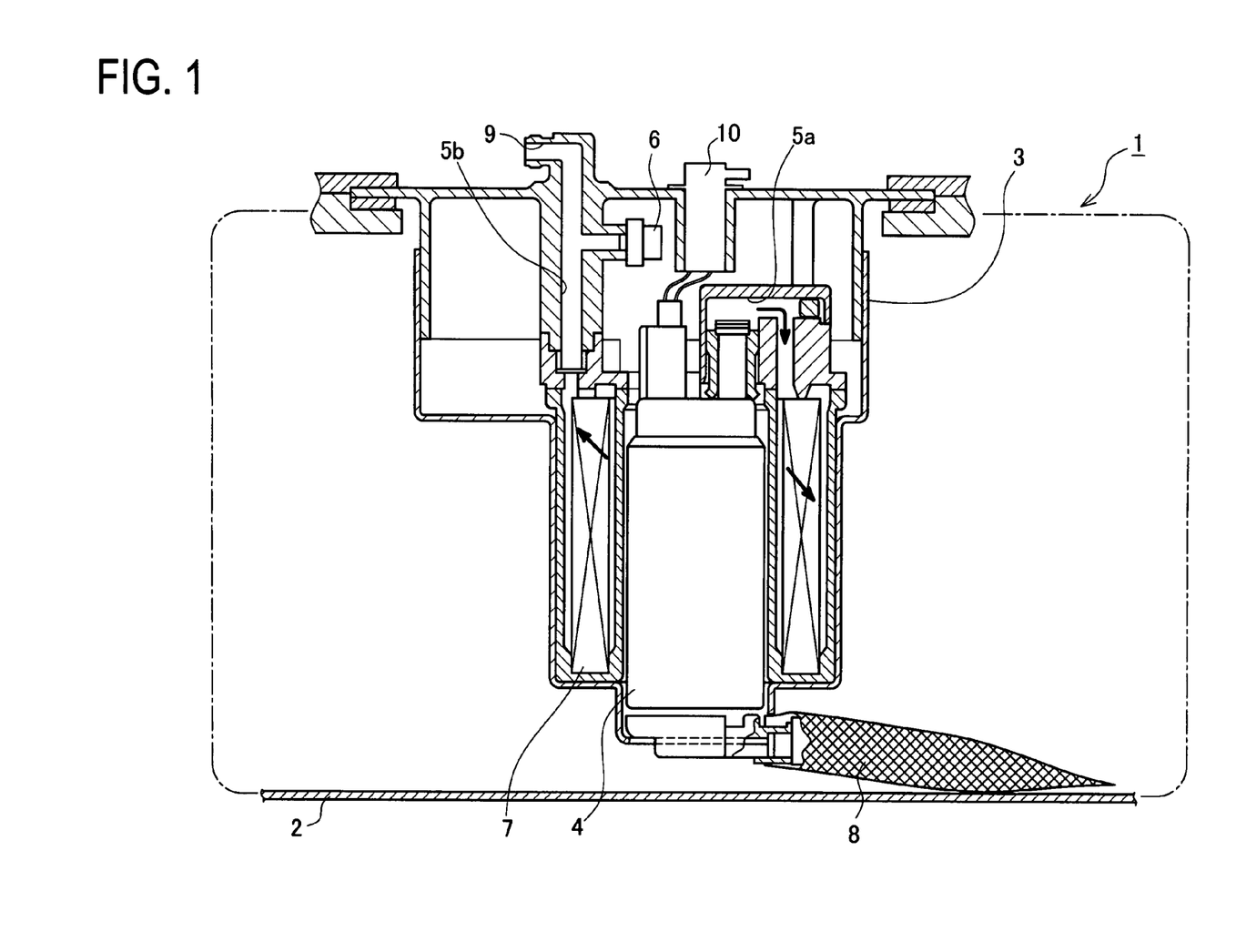
FIG. 1 is a cross-sectional view of a fuel tank.

In the embodiment being described in the following, the present invention is applied to a brushless motor control apparatus for use in a fuel pump of an engine. FIG. 1 is a cross-sectional view of a fuel tank 1 which can be mounted in a vehicle along with the engine. The fuel tank 1 includes a tank body 2 and a high-pressure filter cover 3 formed separately from the tank body 2. A fuel pump 4, fuel passages 5a and 5b, a pressure regulator 6, and a high-pressure fuel filter 7 are accommodated inside the high-pressure filer cover 3. A fuel filter 8 is provided at the inlet of the fuel pump 4. When the fuel pump 4 operates, the fuel contained in the tank body 2 is sucked into the fuel pump 4 via the fuel filter 8. The fuel sucked into the fuel pump 4 is fed through the fuel passage 5a into the high-pressure fuel filter 7, and pressure-regulated by the pressure regulator 6 in passing through the fuel passage 5b, and then discharged from an outlet 9. A controller 10 for controlling the fuel pump 4 is provided at a top portion of the high-pressure filter cover 3. The fuel pump 4 is electrically connected to the controller 10. In the present embodiment, the controller 10 constitutes a control apparatus according to the present invention. In the present embodiment, a brushless motor is adopted as the drive source for the fuel pump 4 so as to lengthen the life of the fuel pump 4.

Figure 2:
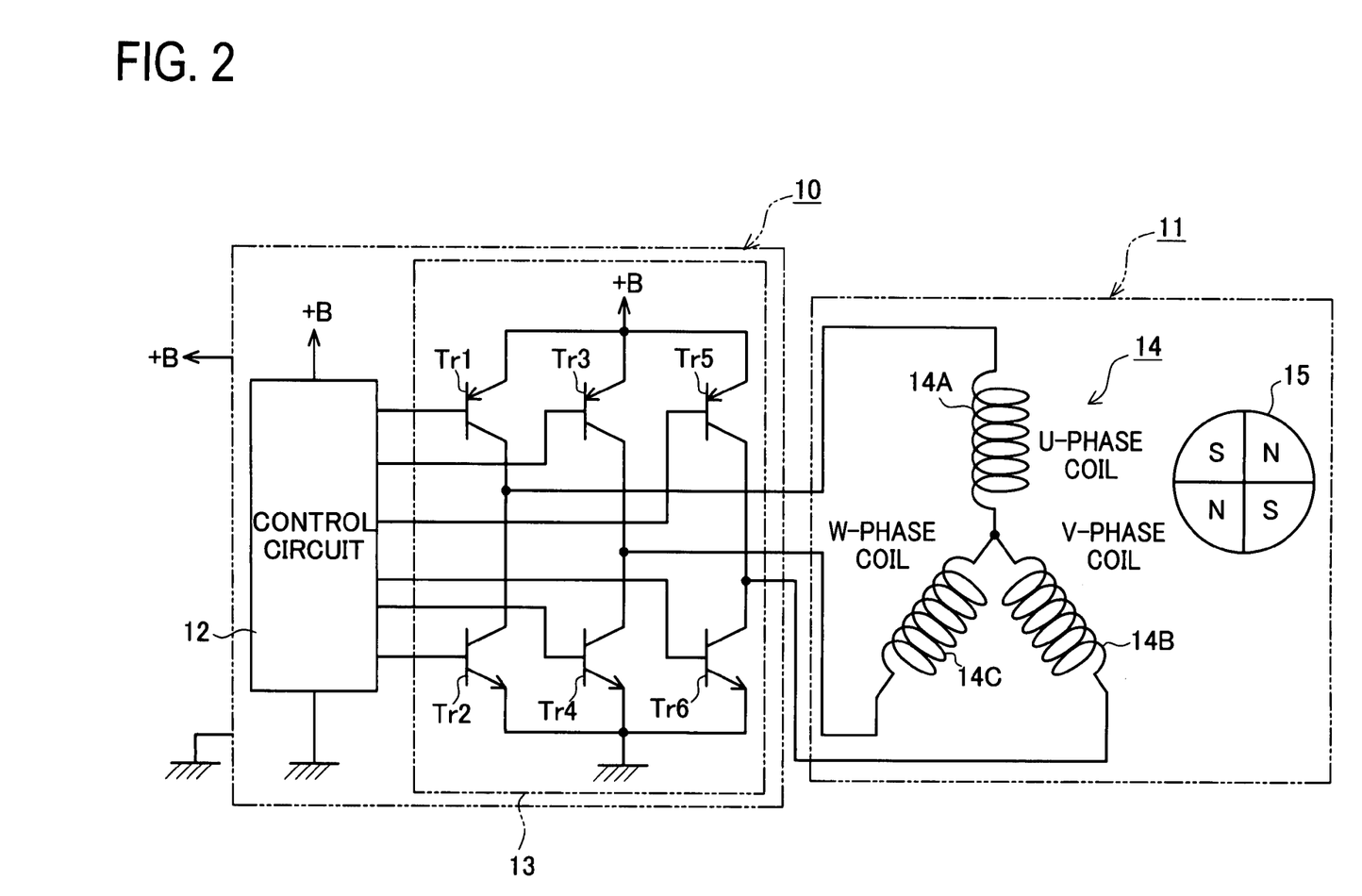
FIG. 2 is an electrical diagram showing the structure of a brushless motor and a controller.

FIG. 2 is an electrical diagram showing the structure of the brushless motor 11 and controller 10 used in the fuel pump 4. The controller 10 includes a control circuit 12 and a drive circuit 13. In the present embodiment, the brushless motor 11 is a three-phase motor. The drive circuit 13 is a three-phase, full-wave drive circuit. In the present embodiment, the brushless motor 11 uses no hall element in detecting the position of a rotor 15 (rotor position). It detects the rotor position by using voltages induced (generated voltages) in phase coils 14A, 14B and 14C (of U, V, and W phases) of the stator included in the brushless motor 11. Namely, the brushless motor 11 detects the rotor position according to voltages induced when the rotor 15 which also serves as a movable member of the fuel pump 4 rotates and, thereby, determines the coil to be energized from among the coils 14A to 14C. When the brushless motor 11 is started up, however, no voltage is induced, so that the rotor 15 is forcibly driven. After voltages start being induced in the phase coils, the rotor 15 starts being driven by a method in which the induced voltages are detected.

As shown in FIG. 2, the drive circuit 13 includes first, third and fifth transistors Tr1, Tr3 and Tr5 of PNP type, and second, fourth and sixth transistors Tr2, Tr4 and Tr6 of NPN type all used as switching elements and connected in a three-phase bridge configuration. The emitters of the first, third and fifth transistors Tr1, Tr3 and Tr5 are connected to a power supply (+B). The emitters of the second, fourth and sixth transistors Tr2, Tr4 and Tr6 are grounded. The three-phase brushless motor 11 includes a stator 14 having the coils 14A, 14B and 14C of the U, V and W phases, respectively, and the rotor 15 of a permanent magnet type. The phase coils 14A to 14C have a common terminal to which all the three phase coils are connected. The other terminal of the coil 14A is connected to a common connection point of the first and second transistors Tr1 and Tr2; that of the coil 14B is connected to a common connection point of the fifth and sixth transistors Tr5 and Tr6; and that of the coil 14C is connected to a common connection point of the third and fourth transistors Tr3 and Tr4. The bases of the transistors Tr1 to Tr6 are connected to the control circuit 12. The two terminals of the control circuit 12 are connected to the power supply (+B) and ground, respectively. In the present embodiment, the control circuit 12 is a custom IC.

Figure 3:
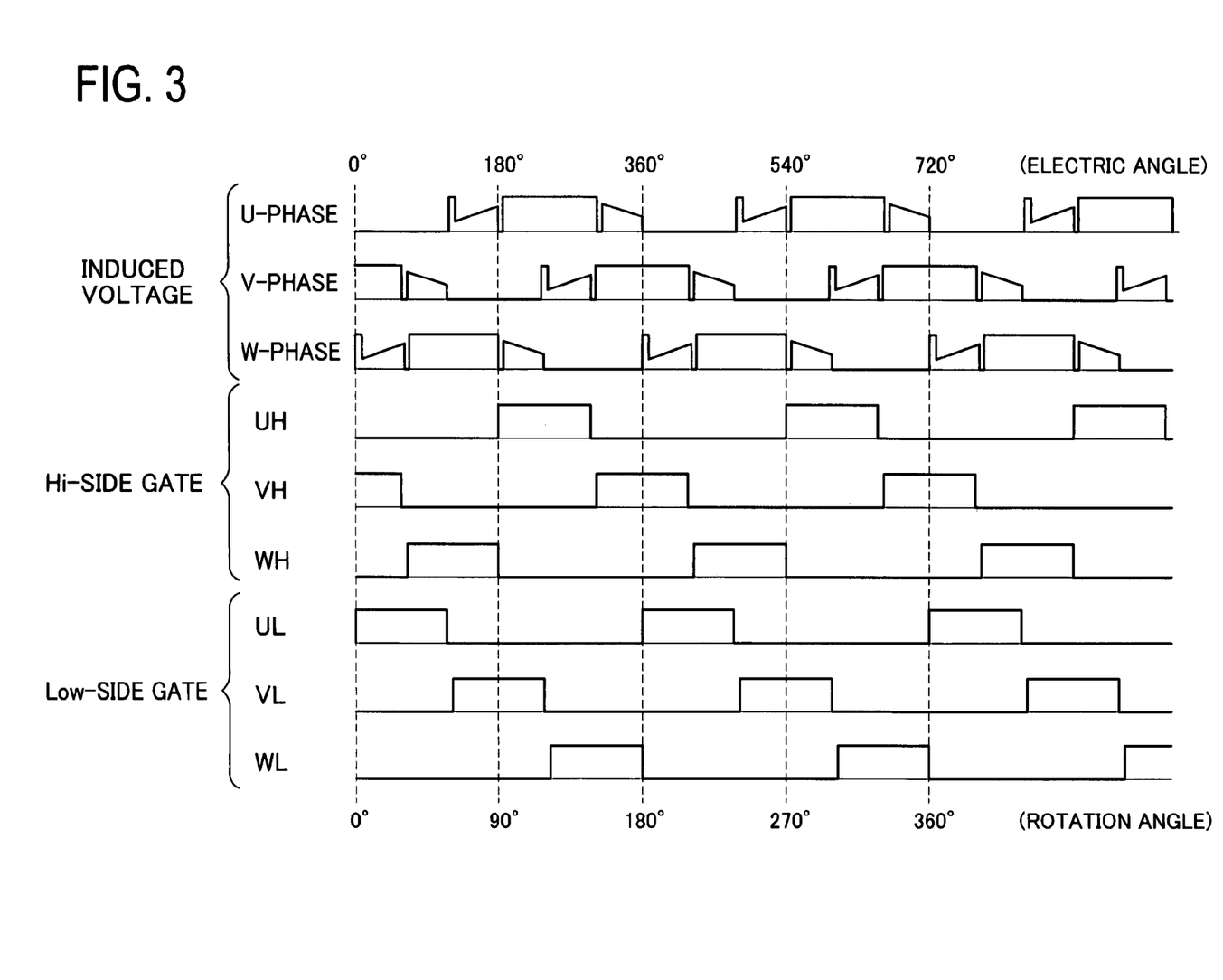
FIG. 3 is a timing chart showing the timing of energization of each phase and changes in induced voltage of each phase.

FIG. 3 is a timing chart showing the timing of phase energization in the brushless motor 11 effected by the control circuit 12 and changes in voltages induced in the phase coils. The control circuit 12 controls the energization of the coils 14A, 14B and 14C of the U, V and W phases, respectively, by controlling the energization of the bases (gates) of the transistors Tr1 to Tr6 included in the drive circuit 13. In FIG. 3, UH, VH and WH denote the high-side gates for setting the U, V and W phases at a high level, respectively, and UL, VL and WL denote the low-side gates for setting the U, V and W phases at a low level, respectively. As shown in FIG. 3, according to the controlled energization of the high-side and low-side gates, the coils 14A, 14B and 14C of the U, V and W phases, respectively, are energized causing voltages to be induced in them.

Figure 4:
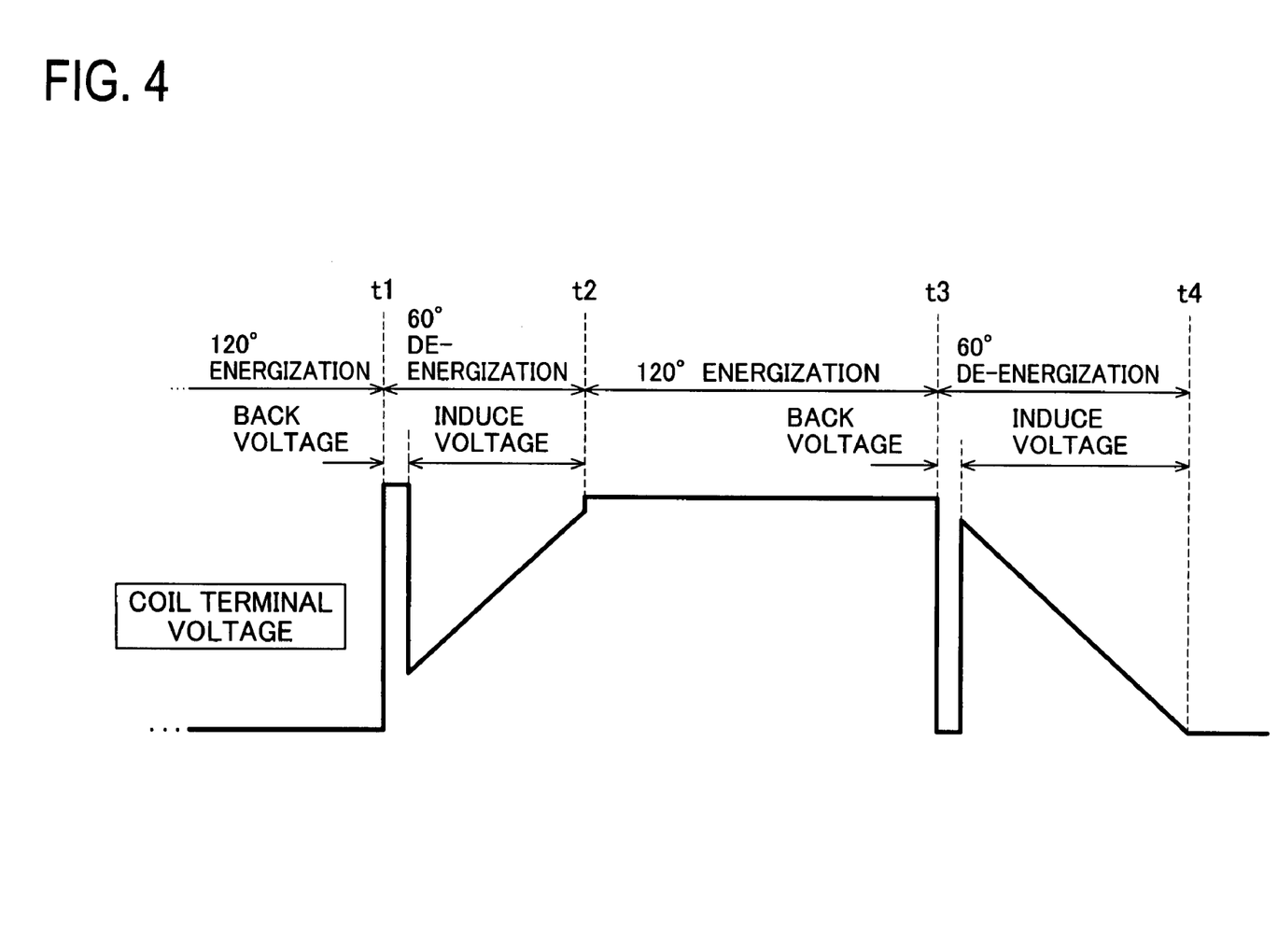
FIG. 4 is a timing chart showing changes in the terminal voltage of each phase coil.

FIG. 4 is a timing chart showing changes in terminal voltages of the coils 14A, 14B and 14C of the U, V and W phases, respectively. As seen from the timing chart, the coils 14A, 14B and 14C undergo "120 degree energization" and "60 degree de-energization" alternately. When, at time t1, a coil is de-energized, a positive back electromotive force in the form of a pulse voltage is generated and then the voltage induced in the coil increases. Next, from when the coil is energized at time t2 until when the coil is de-energized at time t3, the induced voltage in the coil stays positive at a constant level. When the coil is de-energized at time t3, a negative back electromotive force in the form of a pulse voltage is generated and then the voltage induced in the coil decreases. After the coil is energized at time t4, the induced voltage in the coil stays negative at a constant level. The control circuit 12 detects the rotor position based on the voltage induced in the coil following generation of a back voltage.

Figure 5:
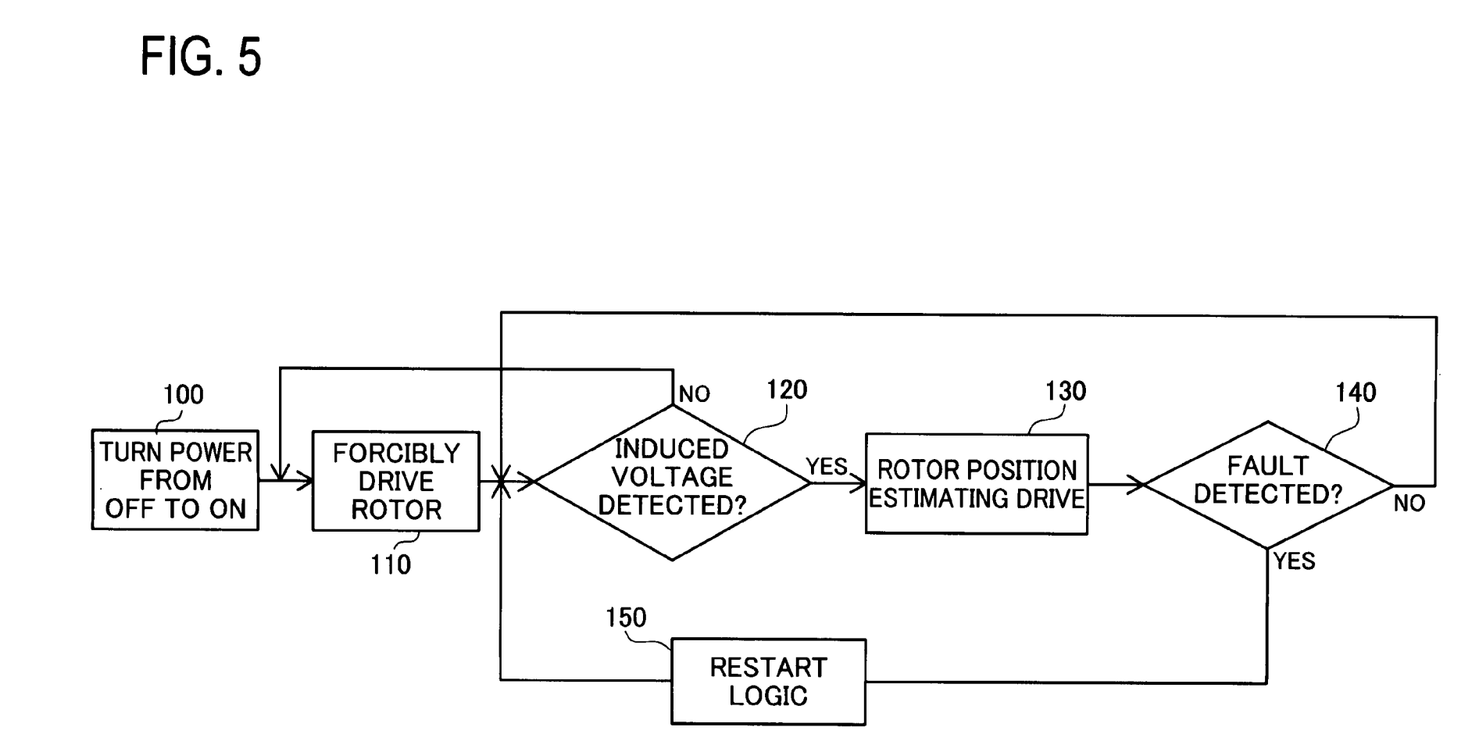
FIG. 5 is a conceptual diagram of control logic executed by a control circuit.

FIG. 5 is a conceptual diagram of control logic executed by the control circuit 12. When, in step 100, the power is turned on, the control circuit 12 forcibly drives the rotor 15 in step 110. Next, in step 120, the control circuit 12 attempts to detect an induced voltage. If no induced voltage is detected, the control circuit 12 returns to step 110 where it forcibly drives the rotor 15 again. When an induced voltage is detected in step 120, the control circuit 12 advances to step 130 and executes a rotor position estimating drive. The process performed in this step will be described in detail later. Subsequently, in step 140, the control circuit 12 attempts to detect a fault. The fault refers to, for example, a loss of synchronism. When no fault is detected, the control circuit 12 returns to step 120 to detect an induced voltage again. If a fault is detected in step 140, the control circuit 12 advances to step 150 and executes restart logic. Subsequently, the control circuit 12 returns to step 120 to detect an induced voltage again.

Figure 6A:
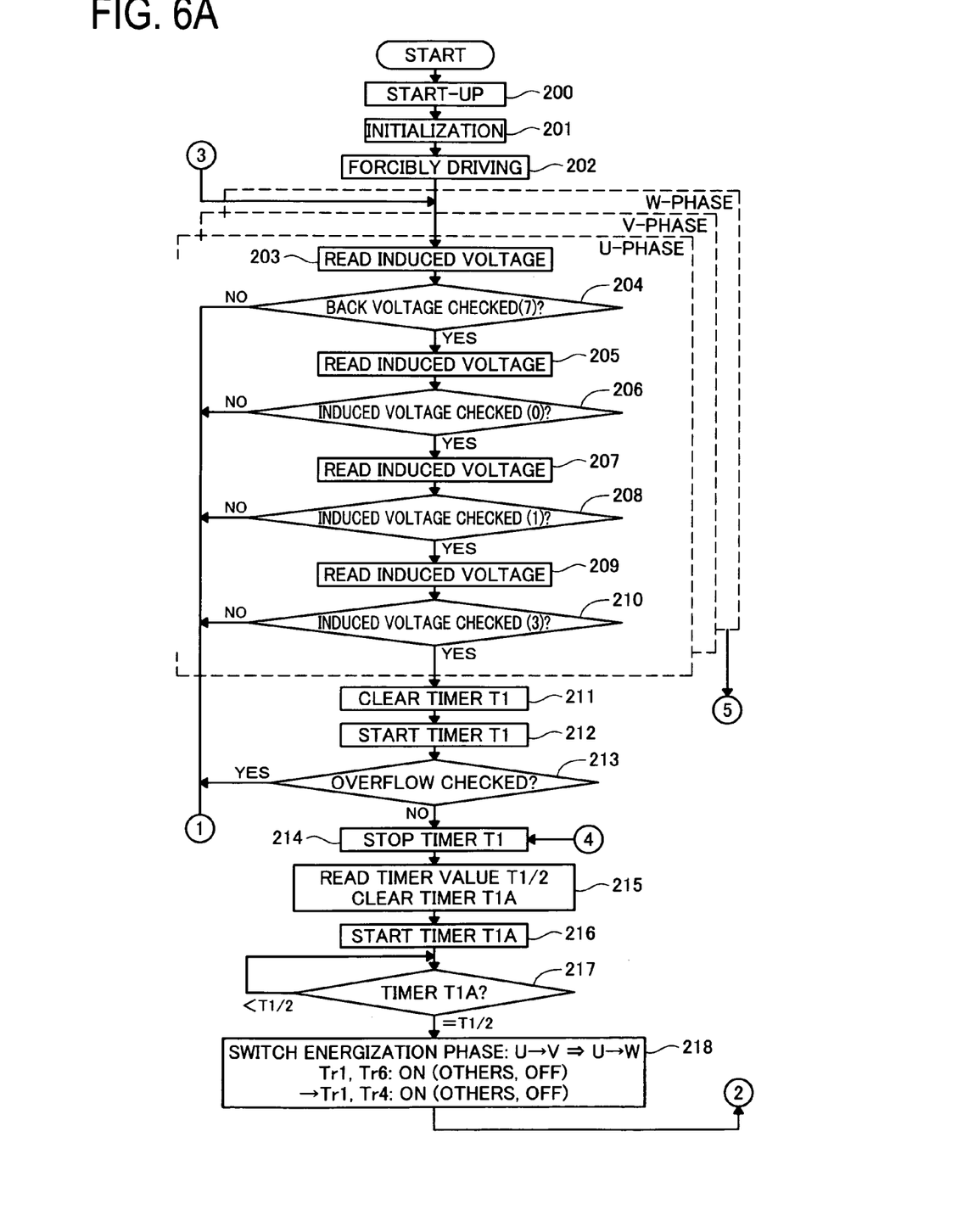
FIGS. 6A and 6B are flowcharts showing the contents of the control logic executed by the control circuit.
Figure 6B:
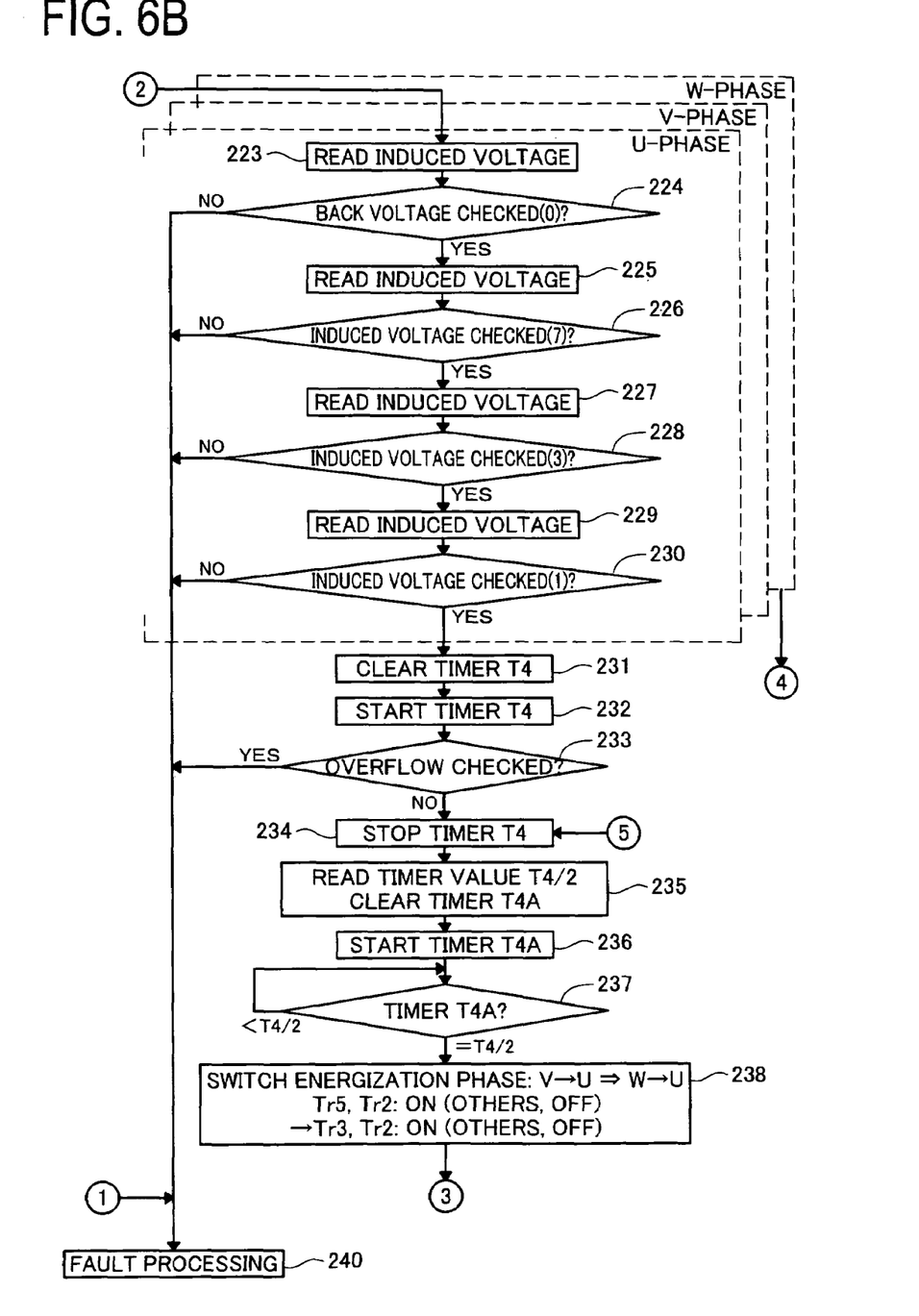
Figure 7:
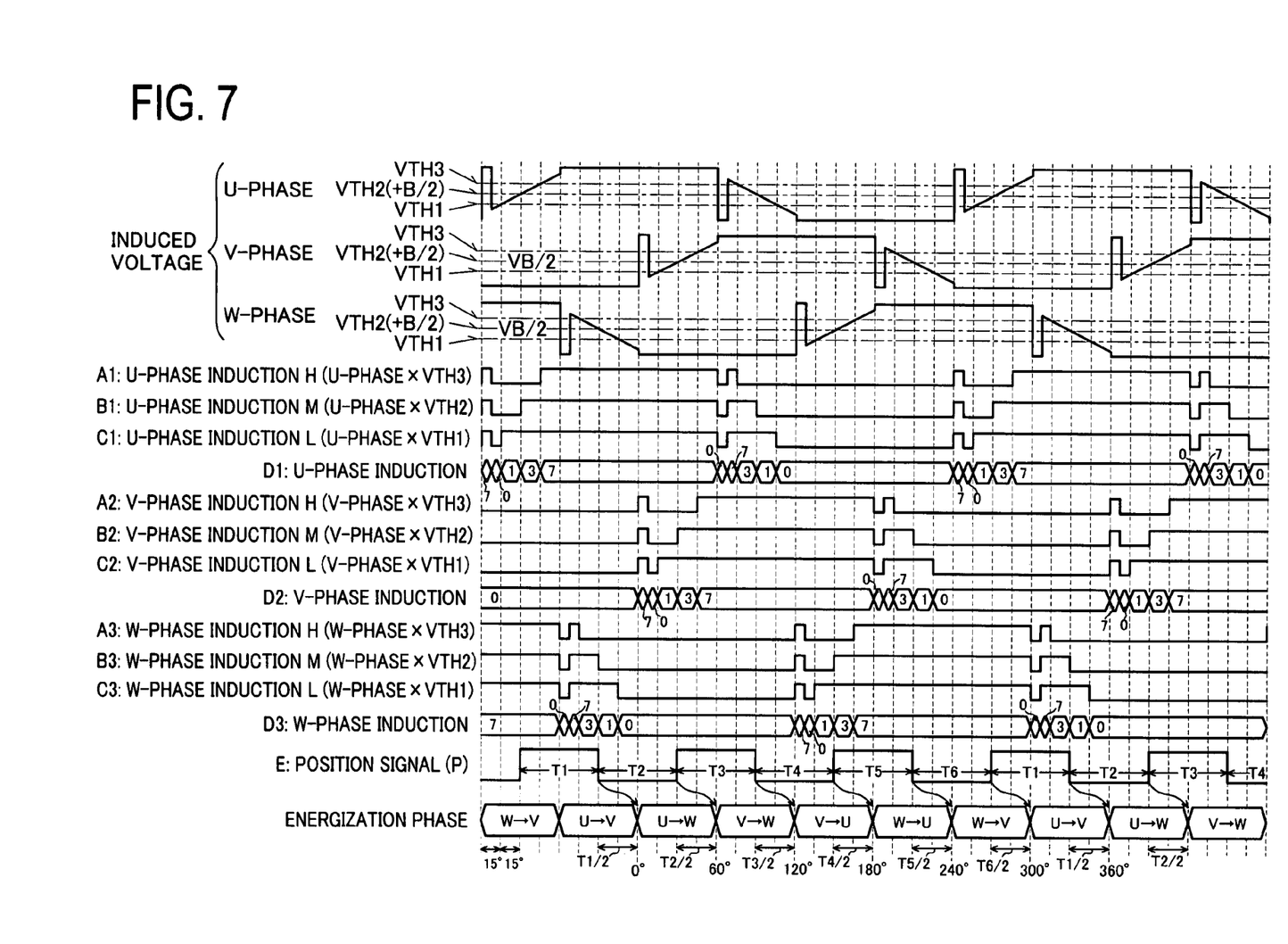
FIG. 7 is a timing chart showing the behavior of parameters.

FIGS. 6A and 6B are flowcharts showing the control logic for the rotor position estimating drive executed by the control circuit 12 utilizing the induced voltage of the U phase. The control logics for the V and W phases will not be described in the following, as they are similar to the control logic for the U phase. FIG. 7 is a timing chart showing the behavior of parameters.

When, in step 200, the brushless motor 11 is started, the control circuit 12 performs initialization in step 201 and forcibly drives the rotor 15 in step 202.

Subsequently, the control circuit 12 reads an induced voltage of the U phase in step 203. Then, based on the induced voltage of the U phase it read, the control circuit 12 checks if the induced voltage is a back voltage in step 204. In checking for a back voltage, the control circuit 12 uses first to third reference voltages VTH1 (+B/4), VTH2 (+B/2) and VTH3 (+3B/4) as judgment values. Namely, the control circuit 12 determines waveforms of U-phase induction H (A1), U-phase induction M (B1) and U-phase induction L (C1) by comparing the induced voltage it read with the first to third reference voltages. The first reference voltage VTH1 is equal to one fourth of the supply voltage (+B), i.e. equal to +B/4. The second reference voltage VTH2 indicates a neutral point of the induced voltage, and it is equal to one half of the supply voltage (+B), i.e. equal to +B/2. The third reference voltage VTH3 is equal to three fourths of the supply voltage (+B), i.e. equal to +3B/4. When the induced voltage of the U phase is smaller than the first reference voltage VTH1, the U-phase induction H (A1) becomes of a high level. When the induced voltage is equal to the second reference voltage VTH2, the U-phase induction M (B2) becomes of a high level. When the induced voltage is larger than the third reference voltage VTH3, the U-phase induction L (C1) becomes of a high level. The control circuit 12 determines the logic mode based on the combination of the waveforms A1, B1 and C1 of the U-phase induction H, M and L. The logic mode is represented by one of "0", "1", "3" and "7" which are decimal numbers converted from three-bit binary numbers representing the states of combination of the waveforms A1, B1 and C1. "0" represents a check result determining that the waveforms A1, B1 and C1 are all at a low level (000). "1" represents a check result determining that only the waveform C1 is at a high level (001). "3" represents a check result determining that only the waveforms B1 and C1 are at a high level (011). "7" represents a check result determining that the waveforms A1, B1 and C1 are all at a high level (111). By converting the check result into a logic signal, the control circuit 12 obtains a value 0, 1, 3, or 7 as a U-phase induction waveform D1. Therefore, in step 204, the control circuit 12 checks if the induced voltage is a back voltage, namely, whether or not the U-phase induction waveform D1 is "7". When the check result is negative, the control circuit 12 regards the check result as indicating that a fault (for example, abnormally low induced voltage resulting from an abnormal drop in supply voltage) has been detected, and executes fault processing in step 240. In the fault processing, restart logic is executed, for example, as shown as step 150 in FIG. 5. The restart logic indicates that the brushless motor 11 being driven after detection of an induced voltage is stopped once, and induced voltage reading is started again. If no induced voltage is detected at this time, the brushless motor 11 is forcibly driven.

When the check result in step 204 is affirmative, the control circuit 12 reads the induced voltage in step 205, and executes in step 206 an induced voltage check based on the induced voltage it has read. In this step, the control circuit 12 checks if the U-phase induction waveform D1 is "0". If the check result in step 206 is negative, the control circuit 12 regards that a fault has been detected and executes fault processing in step 240.

When the check result in step 206 is affirmative, the control circuit 12 reads the induced voltage in step 207, and executes in step 208 an induced voltage check based on the induced voltage it has read. In this step, the control circuit 12 checks if the U-phase induction waveform D1 is "1". If the check result in step 208 is negative, the control circuit 12 regards that a fault has been detected and executes fault processing in step 240.

When the check result in step 208 is affirmative, the control circuit 12 reads the induced voltage in step 209, and executes in step 210 an induced voltage check based on the induced voltage it has read. In this step, the control circuit 12 checks if the U-phase induction waveform D1 is "3". If the check result in step 210 is negative, the control circuit 12 regards that a fault has been detected and executes fault processing in step 240. When the check result in step 210 is affirmative, the control circuit 12 advances to step 211.

The processing of steps 203 to 210 is for checking the induced voltage when it is increasing as shown in FIG. 4. The control circuit 12 concurrently performs similar processing also for the V and W phases.

The control circuit 12 clears a timer T1 in step 211 and starts it in step 212. Subsequently, in step 213, the control circuit 12 checks if the timer Ti has overflowed. If the check result in step 213 is affirmative, the control circuit 12 executes fault processing in step 240.

When the check result in step 213 is negative, the control circuit 12 advances to step 214. When the check result in step 230 on the W phase is affirmative, namely, when the W-phase induction waveform D3 is "1", the control circuit 12 stops the timer T1 in step 214.

Subsequently, in step 215, the control circuit 12 reads in a value equal to one half of the value of the timer T1 (i.e. T1/2 where T1 is the timer value) and clears a timer T1A. The control circuit 12 starts the timer T1A in step 216 and advances to step 217 where it waits for the value of the timer T1A to become "T1/2". When the value of the timer T1A becomes "T1/2", the control circuit 12 switches phase energization from "U→V" to "U→W" in step 218. To do this, the control circuit 12 switches the state where the transistors Tr1 and Tr6 are "ON" with the other transistors "OFF" to a state where the transistors Tr1 and Tr4 are "ON" with the other transistors "OFF".

Subsequently, the control circuit 12 executes steps 223 to 230. The processing of steps 223 to 230 is for checking the induced voltage when it is decreasing as shown in FIG. 4. The control circuit 12 concurrently performs similar processing also for the V and W phases.

Namely, the control circuit 12 reads the induced voltage in step 223, and checks if the induced voltage is a back voltage, namely, whether or not the U-phase induction waveform D1 is "0" in step 224. If the check result in step 224 is negative, the control circuit 12 regards that a fault has been detected and executes fault processing in step 240.

When the check result in step 224 is affirmative, the control circuit 12 reads the induced voltage in step 225, and executes in step 226 an induced voltage check based on the induced voltage it has read. In this step, the control circuit 12 checks if the U-phase induction waveform D1 is "7". If the check result in step 226 is negative, the control circuit 12 regards that a fault has been detected and executes fault processing in step 240.

When the check result in step 226 is affirmative, the control circuit 12 reads the induced voltage in step 227, and executes in step 228 an induced voltage check based on the induced voltage it has read. In this step, the control circuit 12 checks if the U-phase induction waveform D1 is "3". If the check result in step 228 is negative, the control circuit 12 regards that a fault has been detected and executes fault processing in step 240.

When the check result in step 228 is affirmative, the control circuit 12 reads the induced voltage in step 229, and executes in step 230 an induced voltage check based on the induced voltage it has read. In this step, the control circuit 12 checks if the U-phase induction waveform D1 is "1". If the check result in step 230 is negative, the control circuit 12 regards that a fault has been detected and executes fault processing in step 240. When the check result in step 230 is affirmative, the control circuit 12 advances to step 231.

The control circuit 12 clears a timer T4 in step 231 and starts it in step 232. Subsequently, in step 233, the control circuit 12 checks if the timer T4 has overflowed. If the check result in step 233 is affirmative, the control circuit 12 executes fault processing in step 240.

When the check result in step 233 is negative, the control circuit 12 advances to step 234. When the check result in step 210 on the W phase is affirmative, namely, when the W-phase induction waveform D3 is "3", the control circuit 12 stops the timer T4 in step 234.

Subsequently, in step 235, the control circuit 12 reads in a value equal to one half of the value of the timer T4 (i.e. T4/2 where T4 is the timer value) and clears a timer T4A. The control circuit 12 starts the timer T4A in step 236 and advances to step 237 where it waits for the value of the timer T4A to become "T4/2" When the value of the timer T4A becomes "T4/2", the control circuit 12 switches phase energization from "V→U" to "W→U" in step 238. To do this, the control circuit 12 switches the state where the transistors Tr5 and Tr2 are "ON" with the other transistors "OFF" to a state where the transistors Tr3 and Tr2 are "ON" with the other transistors "OFF". Subsequently, the control circuit 12 repeats the processing starting from step 203 over again.

As is clear from the timing chart shown in FIG. 7, a position signal E is formed based on the behavior of timers T1 to T4 inclusive of the above timers T1 and T4. When to switch phase energization next is determined by counting one half of the time taken by the position signal E to reach a high level or a low level (T1/2, T2/2, T3/2 or T4/2).

According to the control apparatus for a brushless motor of the present embodiment described above, the control circuit 12 detects, in the brushless motor 11 provided in the fuel pump 4, the phase of the rotor 15 (rotor position) based on the voltages induced in the coils 14A, 14B and 14C of the U, V and W phases, respectively, and controls energization of the coils 14A, 14B and 14C based on the detected phase. To do this, the control circuit 12 checks the induced voltages to determine their magnitudes using the three reference voltages VTH1, VTH2 and VTH3 as judgment values, and converts the check result into a logic mode, i.e. a logic signal. The control circuit 12 detects the time when the logic signal undergoes a prescribed change, namely, the time when the value converted from the check result changes from 1 to 3 or from 3 to 1 indicating that the induced voltage is at a neutral point as data indicating the phase of the rotor 15 (rotor position). As shown in FIG. 7, when the converted value changes from 1 to 3, the control circuit 12 changes the level of the position signal E from low to high. When the converted value changes from 3 to 1, the control circuit 12 changes the level of the position signal E from high to low. In this way, the control circuit 12 completes generation of the position signal E. When, after the position signal E is set to a high level or a low level, one half of the high or low level duration time passes, the control circuit 12 switches the phase energization.

Thus, according to the control apparatus, in detecting a neutral point of an induced voltage, it is possible, without applying any mask, to distinguish a pulse-shaped back voltage from others. It is therefore possible to properly detect the phase of the rotor 15 (rotor position) without applying any mask in detecting a neutral point of the induced voltage. With no mask required to be applied in detecting a neutral point of the induced voltage, it is not necessary to be concerned about the masking time even in cases where a pulse-shaped induced voltage stays relatively long in a brushless motor with large inductance, a brushless motor which draws a large current, or a brushless motor for use in a low-revolution range. This allows the control circuit 12 to be used commonly for different types of brushless motors without requiring its characteristics to be changed for such different types of brushless motors, so that the cost of the control apparatus can be reduced. Also, in developing a brushless motor control apparatus, no process is required to adjust the masking time for the specific brushless motor, so that the development period for the brushless motor control apparatus can be shortened and the production cost thereof can be reduced.

According to the control apparatus of the present embodiment, an induced voltage is checked using the three reference voltages VTH1, VTH2 and VTH3 as judgment values. A check result is converted into a logic mode, i.e. a logic signal which is expected to cyclically change from 7 to 0 to 1 to 3 to 7 to 0 to 7 to 3 to 1 to 0. When the order of cyclical change is not followed, it is regarded that a fault such as a loss of synchronism has been detected. Therefore, in detecting a neutral point of the induced voltage, it is possible, without applying any mask, to distinguish a pulse-shaped back voltage from others. Hence, it is possible to properly detect a fault without applying any mask in detecting a neutral point of the induced voltage. This allows the phase of the rotor 15 (rotor position) to be properly detected.

According to the present embodiment, the second reference voltage VTH2 among the three reference voltages VTH1 to VTH3 is equal to one half of the neutral point voltage (+B/2) of each of the coils 14A, 14B and 14C of the U, V and W phases, respectively, i.e. equal to one half of the supply voltage (+B), so that it is possible to distinguish a neutral point voltage in each of the coils 14A, 14B and 14C of the U, V and W phases from others based on a prescribed change in the logic signal or based on the cyclical change of the logic signal. Hence, the phase of a neutral point of the induced voltage can be directly recognized.

Furthermore, according to the present embodiment, the three reference voltages VTH1, VTH2 and VTH3 are used as three judgment values for checking induced voltages. This makes it possible to more accurately distinguish, based on a check result, the four modes, i.e. the four values 0, 1, 3 and 7 converted from the logic signal. As a result, the accuracy of detecting the phase of the rotor 15 (rotor position) can be enhanced, and the brushless motor 11 can be controlled to securely operate.

The present invention is not limited to the above embodiment. The invention can be partly modified as follows without departing from the scope thereof.

For example, in the above embodiment, three reference voltages VTH1, VTH2 and VTH3 are used as the judgment values for checking induced voltages. Alternatively, four or more reference voltages may be used. It is particularly preferable to use five reference voltages. Accordingly, this configuration using four or more reference voltages makes it possible to further accurately detect the time when each reference voltage becomes equal to the neutral point (+B/2) based on the induced voltage. This is because the use of four or more, in particular five, reference voltages makes it easy to distinguish between the intended induced voltage and impulse noise. The induced voltage will gradually increase (or decrease) while exceeding the reference voltages in order from low to high. On the other hand, impulse noise which sharply rises will exceed the high reference voltage at once, skipping the low reference voltages. This difference can be made more definite when four or more, particularly five, reference voltages are used to be compared with the induced voltage so that the impulse noise can be detected separately from other signals. Thus, the accuracy of detecting the phase of the rotor 15 (rotor position) can be enhanced, and the brushless motor 11 can be controlled to securely operate.

Figure 8:
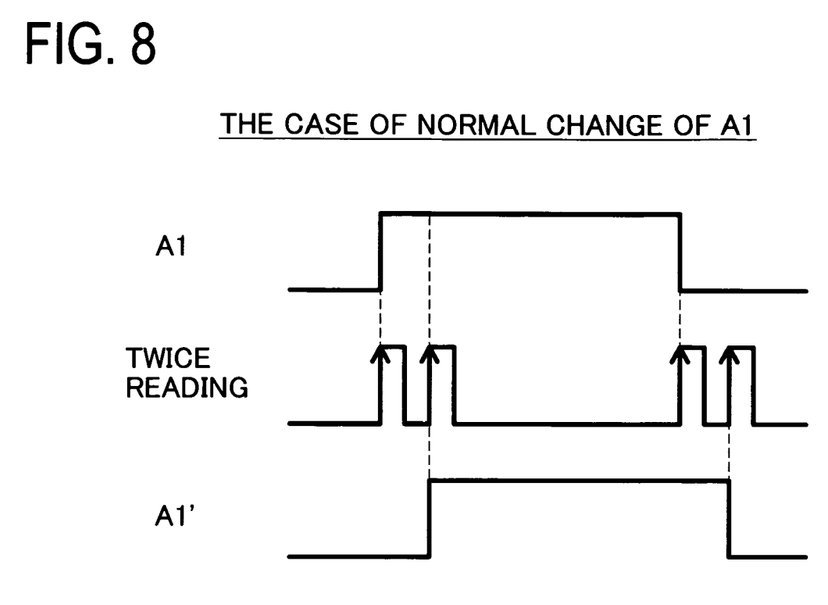
FIG. 8 is a timing chart showing timings of a waveform A1 and waveform for twice reading.
Figure 9:
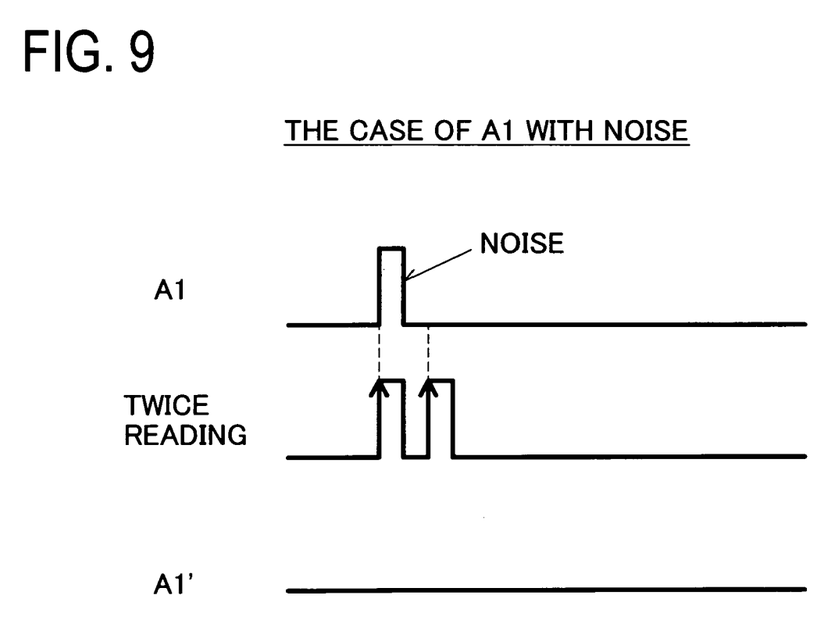
FIG. 9 is a timing chart showing timings of a waveform A1 and waveform for twice reading.

For example, a result of checking an induced voltage to be converted into a logic signal may be finalized after reading and checking, using judgment values, an induced voltage plural times at prescribed intervals. As shown in FIGS. 8 and 9, for example, the control circuit 12 may repeat reading the rise and fall of the waveform of the U-phase induction H (A1) twice at a prescribed interval. If, at that time, the U-phase induction H (A1) is changing in a normal manner, the U-phase induction H (A1') can be properly read slightly behind the U-phase induction H (A1) (see FIG. 8). If a noise occurs in the U-phase induction H (A1), reading the waveform for the second time makes it possible to avoid the noise and obtain the U-phase induction H (A1') without noise (see FIG. 9). In this way, a change in the U-phase induction H (A1) is recognized only after it is confirmed that no further change has occurred within a certain period of time. Thus, since effects of noise can be removed, the brushless motor 11 can be controlled to reliably operate. The number of times of reading and checking an induced voltage is not limited to two. It may be, for example, three or more.

Even though, in the foregoing embodiment, the control apparatus according to the present invention is applied to the brushless motor 11 incorporated in the fuel pump 4 of the engine, the application of the present invention is not limited to the embodiment. The present invention may also be applied to, for example, a brushless motor for use in a water pump serving as a cooling device of the engine.

Even though, in the foregoing embodiment, the value of the second reference voltage VTH2 is equalized with a neutral point of an induced voltage, one of the plural reference voltages may be made equal to one half of the DC supply voltage.

What is claimed is:

1. A brushless motor control apparatus for a pump, the control apparatus being adapted to detect a phase based on an induced voltage in each phase coil of a brushless motor provided in a pump and control energization of the each phase coil based on the detected phase:

wherein the control apparatus checks the induced voltage in each phase coil by using a plurality of reference voltages as judgment values, converts a result of the check into a logic signal in each phase coil, and detects the phase based on a prescribed change in the logic signal in each phase coil.

2. A brushless motor control apparatus for a pump, the control apparatus being adapted to detect a phase based on an induced voltage in each phase coil of a brushless motor provided in a pump and control energization of the each phase coil based on the detected phase:

wherein the control apparatus checks the induced voltage in each phase coil by using a plurality of reference voltages as judgment values, converts a result of the check into a logic signal in each phase coil, and detects a fault based on a cyclical change of the logic signal in each phase coil.

3. The brushless motor control apparatus for a pump according to claim 1, wherein the control apparatus checks the induced voltage in each phase coil by using a plurality of reference voltages as judgment values, converts a result of the check into a logic signal, and detects a fault based on a cyclical change of the logic signal in each phase coil.

4. The brushless motor control apparatus for a pump according to claim 1, wherein one of the plurality of reference voltages is one of a neutral point voltage of the each phase coil and a voltage equal to one half of a DC supply voltage.

5. The brushless motor control apparatus for a pump according to claim 1, wherein the plurality of reference voltages are three to five voltages.

6. The brushless motor control apparatus for a pump according to claim 4, wherein the plurality of reference voltages are three to five voltages.

7. The brushless motor control apparatus for a pump according to claim 1, wherein the control apparatus performs the conversion into a logic signal by reading, a plurality of number of times at prescribed intervals, a result of the check made using the judgment values.

8. The brushless motor control apparatus for a pump according to claim 6, wherein the control apparatus performs the conversion into a logic signal by reading, a plurality of number of times at prescribed intervals, a result of the check made using the judgment values.

9. The brushless motor control apparatus for a pump according to claim 2, wherein one of the plurality of reference voltages is one of a neutral point voltage of the each phase coil and a voltage equal to one half of a DC supply voltage.

10. The brushless motor control apparatus for a pump according to claim 2, wherein the plurality of reference voltages are three to five voltages.

11. The brushless motor control apparatus for a pump according to claim 9, wherein the plurality of reference voltages are three to five voltages.

12. The brushless motor control apparatus for a pump according to claim 2, wherein the control apparatus performs the conversion into a logic signal by reading, a plurality of number of times at prescribed intervals, a result of the check made using the judgment values.

13. The brushless motor control apparatus for a pump according to claim 11, wherein the control apparatus performs the conversion into a logic signal by reading, a plurality of number of times at prescribed intervals, a result of the check made using the judgment values.

14. The brushless motor control apparatus for a pump according to claim 3, wherein one of the plurality of reference voltages is one of a neutral point voltage of the each phase coil and a voltage equal to one half of a DC supply voltage.

15. The brushless motor control apparatus for a pump according to claim 3, wherein the plurality of reference voltages are three to five voltages.

16. The brushless motor control apparatus for a pump according to claim 14, wherein the plurality of reference voltages are three to five voltages.

17. The brushless motor control apparatus for a pump according to claim 3, wherein the control apparatus performs the conversion into a logic signal by reading, a plurality of number of times at prescribed intervals, a result of the check made using the judgment values.

18. The brushless motor control apparatus for a pump according to claim 16, wherein the control apparatus performs the conversion into a logic signal by reading, a plurality of number of times at prescribed intervals, a result of the check made using the judgment values.

19. The brushless motor control apparatus for a pump according to claim 14, wherein the control apparatus performs the conversion into a logic signal by reading, a plurality of number of times at prescribed intervals, a result of the check made using the judgment values.

20. The brushless motor control apparatus for a pump according to claim 15, wherein the control apparatus performs the conversion into a logic signal by reading, a plurality of number of times at prescribed intervals, a result of the check made using the judgment values.

21. A brushless motor control apparatus for a pump, the control apparatus being adapted to detect a phase based on an induced voltage in each phase coil of a brushless motor provided in a pump and control energization of the each phase coil based on the detected phase:

wherein arithmetic processing of a waveform obtained by comparison between the induced voltage in each phase coil and three or more reference voltages is performed to detect a position of a movable member of the pump.

22. The brushless motor control apparatus for a pump according to claim 21, wherein the reference voltages are five voltages.

23. The brushless motor control apparatus for a pump according to claim 21, wherein one of the reference voltages is one of a voltage at a neutral point of each phase coil and a voltage equal to one half of a DC supply voltage.

24. The brushless motor control apparatus for a pump according to claim 22, wherein one of the reference voltages is one of a voltage at a neutral point of each phase coil and a voltage equal to one half of a DC supply voltage.

* * * * *